United States Patent Office.

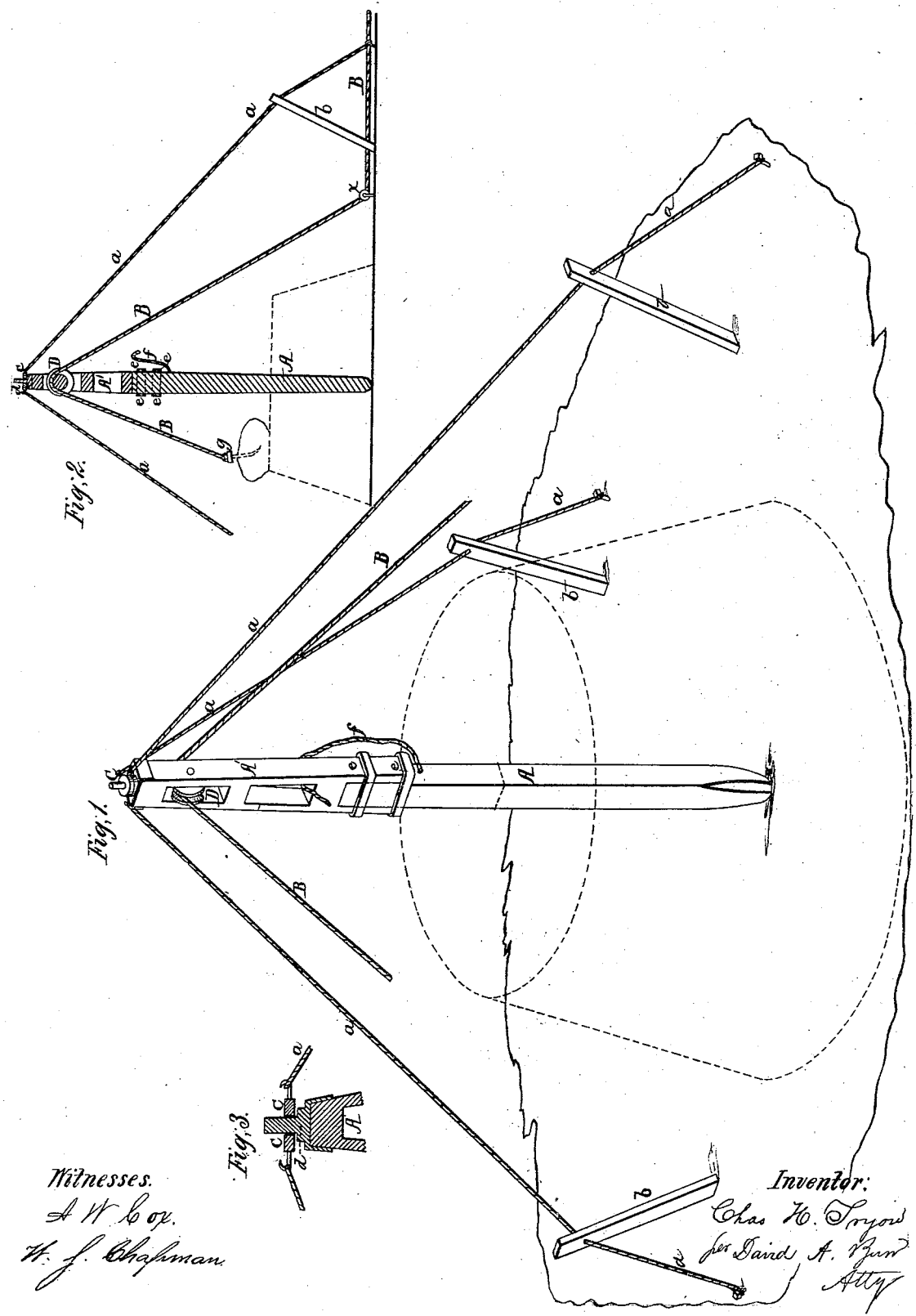

CHARLES H. TRYON, OF GREENWOOD, ILLINOIS.

Letters Patent No. 61,642, dated January 29, 1867.

IMPROVEMENT IN APPARATUS FOR STACKING HAY.

*The Schedule referred to in these Letters Patent and making part of the same.*

TO ALL WHOM IT MAY CONCERN:

Be it known that I, CHARLES H. TRYON, of Greenwood, in the county of McHenry, and State of Illinois, have invented a new and improved Apparatus for Stacking Hay, Fodder, &c.; and I do hereby declare the following to be a full, clear, and exact description thereof, reference being had to the accompanying drawings, forming a part of this specification, in which—

Figure 1 is a perspective view of my apparatus, illustrating in red lines a partially finished stack.

Figure 2 is a central vertical section of the same on a somewhat smaller scale; and Figure 3, a sectional view of the upper part of the apparatus, shown in the other two figures.

Similar letters indicate like parts in all of the figures.

The nature of my invention consists in the employment of a vertical sectional shaft, when combined with suitable hoisting mechanism, so constructed and arranged as to admit of the required adjustment of said shaft, the whole constituting an apparatus for stacking hay, fodder, &c.

For convenience and dispatch I prefer to locate the shaft centrally, around which the stack is built up, though without any change in the construction. My apparatus may be located a convenient distance from the stack and be thus used for working a horse fork or elevating by hand bundles of hay, &c., as the case may be.

The main shaft is made in two or more sections A A', and the upper section furnished with a pulley, D, around which passes the elevating rope or chain B. The plate d, which is secured to the upper section, has a shaft, which serves as an axis for the main shaft to move on free of the swivel-head C, to which are attached the guy-ropes a for keeping the main shaft in a vertical position. For the convenience of driving the load close up to the stack and under the guy-ropes a, each of said ropes is provided with an upright, b, which, as shown in the drawings, move, on said ropes, serving as braces to tighten them and at the same time to give them any required elevation. The shaft, when in position, has its lower bearing on the ground and its upper bearing in the swivel-head C; it is therefore only necessary to turn the shaft (which moves in the stack) to a point which will bring the pulley D in position for unloading the wagon and for depositing the nay or other article lifted therefrom upon any given part of the stack.

The great advantage of making the shaft in sections is that in taking down the apparatus after the stack is completed it may be removed, each part separately, as follows, viz: Loose the guy-ropes a by removing the pegs, or by unbracing the standards b. This admits of the swivel-head C being lifted from the upright, which may, together with ropes attached thereto, be thrown clear of the stack. The upper section is then withdrawn, and so on, each section, until all are removed. Each of the lower sections may be provided with a rope, f, for the purpose of withdrawing them through the opening in the top of the stack. The sections of the main shaft may be connected, as shown in the drawings, by providing one end of each section with a vertical socket, which is encircled by two or more metal bands e, into which recess is fitted the end of the next section; or they may be connected in any other suitable manner. For the purpose of working a horse fork, g, one end of the rope B is passed around the pulley x, and the other end secured to the fork g, as shown in fig. 2 of the accompanying drawings.

I claim as new, and desire to secure by Letters Patent—

My improved apparatus for stacking hay and for other purposes, constructed of a central upright formed of one or more separate adjustable sections, A A', as shown in the accompanying drawings, in combination with a crowning pivot-plate and pin d, revolving swivel-head C, and suitable supporting-ropes or chains a, all arranged and operating substantially in the manner and for the purpose herein described.

The foregoing specification of my improved apparatus for stacking hay, &c., signed by me this 22d day of September, A. D. 1866.

CHAS. H. TRYON.

Witnesses:
R. W. STEWART,
GEO. F. TRYON.